May 7, 1929.  H. H. CLAPP  1,712,198

DEVICE FOR HOLDING CHILDREN IN SEATS

Filed March 9, 1927

INVENTOR
Harold H. Clapp
BY
his ATTORNEYS

Patented May 7, 1929.

1,712,198

UNITED STATES PATENT OFFICE.

HAROLD H. CLAPP, OF ROCHESTER, NEW YORK.

DEVICE FOR HOLDING CHILDREN IN SEATS.

Application filed March 9, 1927. Serial No. 173,851.

The present invention relates to a device for holding children in seats and has for one object to provide a simple, inexpensive, and effective device of this character adapted for ready attachment to a seat such as the front or back seat of an automobile.

A further object of the invention is to provide a belt or strap to be worn by the child when occupying the seat, together with flexible retaining means for connecting the same to the seat which will permit the child to readily assume various positions, thereon, such as a standing, sitting or reclining position.

To these and other ends the invention resides in certain improvements and combination of parts, all as will be hereinafter more fully described, the novel features being pointed out in the claims at the end of the specification, In the drawings:

Similar reference numerals throughout the several views indicate the same parts.

In carrying out the present invention I employ a safety device for holding babies or small children in different types of seats and one which is particularly adapted for use with the seats of automobiles and which is constructed to permit the child to have freedom of movement within certain limits, such as standing, sitting or moving from side to side, but which will prevent him from falling off the seat. Thus, means is provided for preventing the child from falling from the vehicle in cases where the door thereof may be left open, or where it may be opened while the vehicle is moving, due to release by vibration or otherwise of a faulty latch. The device is of further advantage for use when driving automobiles, in that it permits a child to accompany its mother or other person responsible for its care when there is no one else to hold or prevent the child from falling from the seat or from the machine.

Figure 1:
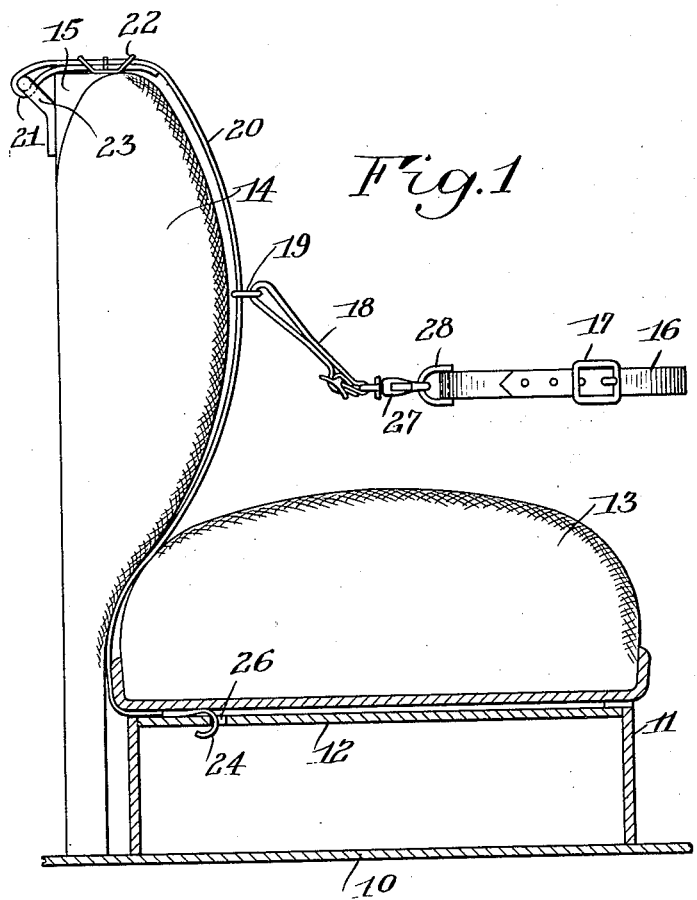
Figure 1 is a part sectional elevation of a seat to which is shown applied one form of the invention.

Referring to the drawings 10 represents a floor or other support for a seat, one type of which is shown in Figure 1, comprising preferably an automobile seat. The seat may be of any well known construction embodying generally a base 11 resting upon the floor and having a frame 12 which may comprise one or more plates upon which a removable seat 13, preferably one of the cushioned type, is adapted to rest. The seat back, which may be of any preferred type, is conventionally shown in Figure 1 and includes a cushion 14 on a suitable frame, a portion of which is indicated at 15. It will be understood that the seat, whether it be the front or rear seat of an automobile, may be of the usual or general construction found in different makes of cars.

Figure 3:
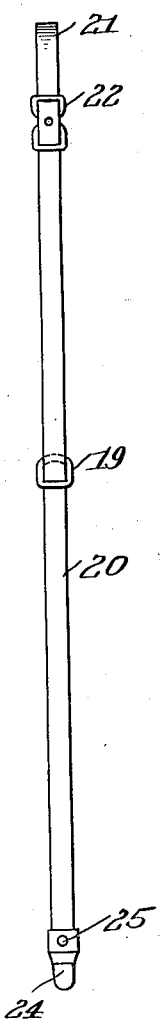
Figure 3 is a detached view of the rear retaining member, shown applied to the back of the seat in Figure 1.
Figure 2:
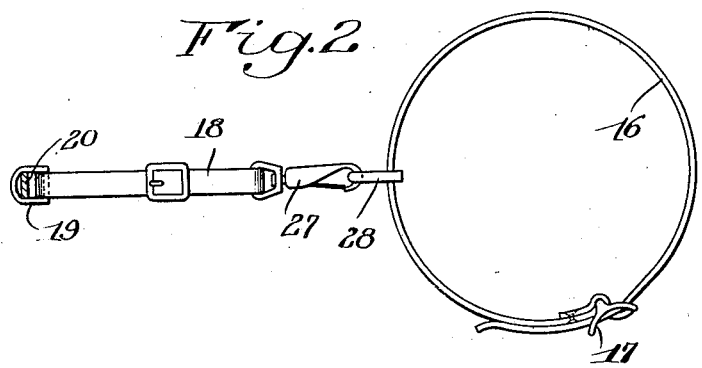
Figure 2 is a plan view, partly in section, showing the belt and means by which it is attached to the seat.

The safety device proper embodies a belt or strap 16 including a buckle 17 and is adapted preferably to be drawn around the child's waist, but may be secured to or beneath its shoulders. Extending from the strap or belt is a flexible connection 18 the rear end of which is suitably connected, as by a ring 19, with a vertically extending member 20 disposed in front of the seat back. The member 20 preferably comprises a strap of suitable material and in the present instance is provided at its upper end with a loop 21 and buckle 22 for securing the end portion of the loop to the main portion of the strap. The loop is attached to a suitable anchor or bracket 23, secured in any desired manner to the top of the seat back and which, in the case of the front seat, may constitute the usual lap robe rail provided at the back of the seat. The member 20, as shown, extends downwardly in front of the seat back, its lower end being carried behind and beneath the seat cushion 13 as indicated in Figure 1. The lower extremity of the strap 16 is preferably provided with a hook-shaped member 24 which may be formed of metal and which is secured to the strap, preferably, by a rivet 25 as shown in Figure 3. The hook-shaped member is connected with the base or frame plate 12 in a suitable manner, as by engaging the latter in an opening 26 thereof as shown in Figure 1, the attachment being made with the cushion 13 removed or partially removed from the base 11. The flexible connection 18 between the member 20 and the strap or belt 16 preferably includes a swivel snap hook 27 detachably connected with a link 38 through which the belt extends, and which is free to shift its position upon the belt whereby to increase the freedom of movement of the child when occupying the seat.

It will be understood that the device may be readily attached to the seat and removed therefrom when not in use, if desired. It will be apparent that the up and down movement of the ring 19 and the turning movement of the swivel 27 will permit the child to move freely upon the seat and to assume various positions thereon, as stated above.

I claim:

1. A device for holding a child in a seat, comprising a strap or the like arranged to extend vertically in front of the back of the seat and having its extremities adapted for connection with the seat, a belt adapted to encircle the child, a stiff ring freely slidable along said strap, and a flexible connection having one end secured to the belt and the other to said ring so that said flexible connection may slide vertically freely relative to said seat.

2. A device for holding a child in a seat, comprising a strap or the like arranged to extend vertically in front of the back of the seat and having its extremities adapted for connection with portions of the seat frame, a belt adapted to encircle the child, and a connection between the belt and the strap, said connection including a ring slidable freely in a horizontal direction upon the belt and a ring slidable freely in a vertical direction upon the strap.

HAROLD H. CLAPP.